US011239675B2

(12) United States Patent
Dong et al.

(10) Patent No.: US 11,239,675 B2
(45) Date of Patent: Feb. 1, 2022

(54) APPARATUS FOR CENTRALIZED CHARGING OF ELECTRONIC PRODUCTS

(71) Applicant: HUAIYIN INSTITUTE OF TECHNOLOGY, Huaian (CN)

(72) Inventors: Yuwei Dong, Huaian (CN); Hongyan Ding, Huaian (CN); Feng He, Huaian (CN); Ling Wang, Huaian (CN); Zhao Zhang, Huaian (CN); Yingying Guan, Huaian (CN); Wenjin Zhao, Huaian (CN); Xin Huang, Huaian (CN); Yanshun Hou, Huaian (CN); Haifeng Zhu, Huaian (CN); Qinqin Liu, Huaian (CN)

(73) Assignee: HUAIYIN INSTITUTE OF TECHNOLOGY, Huaian (CN)

( * ) Notice: Subject to any disclaimer, the term of this patent is extended or adjusted under 35 U.S.C. 154(b) by 129 days.

(21) Appl. No.: 16/614,999

(22) PCT Filed: Jan. 30, 2018

(86) PCT No.: PCT/CN2018/074528
§ 371 (c)(1),
(2) Date: Nov. 19, 2019

(87) PCT Pub. No.: WO2018/218979
PCT Pub. Date: Dec. 6, 2018

(65) Prior Publication Data
US 2020/0203976 A1    Jun. 25, 2020

(30) Foreign Application Priority Data
May 31, 2017   (CN) .......................... 201710400603.4

(51) Int. Cl.
*H02J 7/00*           (2006.01)

(52) U.S. Cl.
CPC .......... *H02J 7/0045* (2013.01); *H02J 7/0013* (2013.01); *H02J 7/00047* (2020.01); *H02J 7/0044* (2013.01)

(58) Field of Classification Search
CPC ..... H02J 7/0013; H02J 7/0045; H02J 7/00047
(Continued)

(56) References Cited

U.S. PATENT DOCUMENTS

| 8,183,825 B2 * | 5/2012 | Sa .......................... G06F 1/1626 320/107 |
| 2002/0115480 A1 * | 8/2002 | Huang .................. H02J 7/0013 455/573 |

(Continued)

FOREIGN PATENT DOCUMENTS

| CN | 1312603 A | 9/2001 |
| CN | 202749877 U | 2/2013 |
| CN | 104092258 A | 10/2014 |
| CN | 107231020 A | 10/2017 |

OTHER PUBLICATIONS

International Search Report issued in corresponding International Application No. PCT/CN2018/074528, dated Mar. 28, 2018, State Intellectual Property Office of the P.R. China, Beijing, China.
(Continued)

*Primary Examiner* — Edward Tso
*Assistant Examiner* — Aaron Piggush
(74) *Attorney, Agent, or Firm* — Hauptman Ham, LLP

(57) ABSTRACT

Disclosed is an apparatus for centralized charging of electronic products, including a base, where charging grooves, charging racks, and a charging stand are provided on the top surface of the base in sequence from front to back; a charging head A is provided in the charging groove; a connecting piece A matching a plug-in type charging head is provided at the lower part of the charging rack; the base is further provided with connecting pieces B matching the
(Continued)

plug-in type charging heads; the connecting pieces B are located at one side of the charging stand; and the charging head A, the connecting piece A, and the connecting piece B are electrically connected to an output end of a power adapter provided in the base, respectively. It can be known from the abovementioned structure that the apparatus for centralized charging of electronic products of the present invention provides a platform for centralized charging of electronic products, which not only can perform direct plug-in type charging on common electronic products to improve charging convenience, but also can charge electronic products of other models and sizes to improve product applicability.

10 Claims, 5 Drawing Sheets

(58) Field of Classification Search
USPC .................................. 320/107, 110, 113, 115
See application file for complete search history.

(56) References Cited

U.S. PATENT DOCUMENTS

| | | | |
|---|---|---|---|
| 2008/0036420 A1* | 2/2008 | Zeiler | H02J 7/0027 320/107 |
| 2009/0295328 A1* | 12/2009 | Griffin, Jr. | H02J 7/0027 320/115 |
| 2011/0095724 A1* | 4/2011 | Byrne | H01R 13/6315 320/115 |
| 2014/0375248 A1* | 12/2014 | Takahashi | H02J 7/0044 320/107 |
| 2017/0153667 A1* | 6/2017 | Suckle | G06F 1/1632 |
| 2018/0369599 A1* | 12/2018 | Smith | A61N 1/3904 |

OTHER PUBLICATIONS

Written Opinion of the International Searching Authority issued in corresponding International Application No. PCT/CN2018/074528, dated Mar. 28, 2018.

* cited by examiner

APPARATUS FOR CENTRALIZED CHARGING OF ELECTRONIC PRODUCTS

RELATED APPLICATION

The present application is a National Phase of International Application Number PCT/CN2018/074528, filed Jan. 30, 2018, and claims priority to chinese Application No. 201710400603.4, filed May 31, 2017.

TECHNICAL FIELD

The present invention relates to the technical field of electronic product charging, and in particular, to an apparatus for centralized charging of electronic products.

BACKGROUND

With the development of technology, the use of electronic products has already been popular. At present, the most widely used electronic products are mobile phones and tablet computers. During using the electronic products, low battery conditions often happen. At this time, charging the electronic products is required. Generally, during charging, it is necessary to connect an electronic product to a power supply through a charging line. However, when there are a large number of electronic products, there may be insufficient sockets for charging the electronic products. Currently, there is no product on the market that can perform centralized charging of a variety of electronic products and can avoid charging lines to be twisted together during charging. Once the charging lines are twisted together, it is quite troublesome to use the electronic products. In addition, since the charging heads and the corresponding charging sockets of mobile phones or tablet computers of different manufacturers have different structures, higher requirements are imposed on how to manufacture an apparatus that can be used for centralized charging of a variety of electronic products.

SUMMARY

The present invention is intended to: overcome the defects of the prior art, provide an apparatus for centralized charging of electronic products, and provide a platform for centralized charging of electronic products, which not only can perform direct plug-in type charging on common electronic products to improve charging convenience, but also can charge electronic products of other models and sizes to improve product applicability. Direct plug-in type charging of a charging groove can enable automatic electrical disconnection of a charging head when the charging groove is not used, thereby protecting the charging head and prolonging the service life of the charging head; when a charging rack and a charging stand do not perform electronic product charging, the plug-in type charging head is separated from a connecting piece A or a connecting piece B so as to protect the plug-in type charging head, thereby prolonging the service life of the plug-in type charging head; under the action of a winding means, twisting together with a power transmission line of the connecting piece B is avoided, so that the use of the connecting piece B is not affected and the apparatus for centralized charging is ensured to be tidy; an identifier area corresponding to the charging groove can facilitate a user quickly identifying the model of an electronic product corresponding to the charging groove; the front end surface of the charging rack inclines backwards from bottom to top, which facilitates fixed placement of the electronic product and improves the stability of the electronic product when placed on the charging rack for charging; a clamping block further improves the stability of the electronic product when placed on the charging rack for charging, and improves the applicability of the charging rack; the wall of a placing groove B is a stepped structure, such that multiple placing layers are formed, and thus multiple electronic products of different models can be placed in the placing groove B, where these electronic products are charged at the same time, thereby improving the applicability and practicality of the charging stand; under the action of a heat dissipation means, heat dissipation can be performed on multiple electronic products on the charging stand to avoid the electronic products and the charging stand from being damaged by heat; a placing surface of the charging stand inclines backwards from bottom to top, which facilitates stable placement of the electronic products; the side of the placing groove B facing the connecting piece B is an open structure, which not only facilitates the placement of the electronic product on the charging stand or the take-out thereof from the charging stand, but also facilitates the charging of the electronic product by the plug-in type charging head fixed by the connecting piece B; and a discharging groove on the charging stand can be used for placing plug-in type charging heads of various electronic product models, which facilitates the take-out and use by the user and also avoids the loss of the plug-in type charging heads.

The technical solution adopted in the present invention is:

an apparatus for centralized charging of electronic products, including a base, where charging grooves, charging racks, and a charging stand are provided on the top surface of the base in sequence from front to back; a charging head A is provided in the charging groove; a connecting piece A matching a plug-in type charging head is provided at the lower part of the charging rack; the base is further provided with connecting pieces B matching the plug-in type charging heads; the connecting pieces B are located at one side of the charging stand; and the charging head A, the connecting piece A, and the connecting piece B are electrically connected to an output end of a power adapter provided in the base, respectively.

The further improved solution of the present invention is: the charging head A is fixed onto the top of a bearing rod; two ends of the bearing rod are rotatably connected to two ends of the charging groove; an electrical rod A electrically connected to the charging head A is provided at the lower part of the back side of the bearing rod; an electrical rod B is provided, correspondingly below the electrical rod A, on the inner wall of the charging groove; and the electrical rod B is electrically connected to the output end of the power adapter provided in the base.

The further improved solution of the present invention is: the electrical rod B is pivotably connected to the charging groove; and the bottom of the electrical rod B is connected to the bottom of the charging groove by means of a spring.

The further improved solution of the present invention is: the charging head A is provided on the bottom of a placing groove A provided on the top of the bearing rod.

The further improved solution of the present invention is: there are multiple charging grooves, which are provided at the front side of the top surface of the base in sequence.

The further improved solution of the present invention is: the base is provided with an identifier area respectively corresponding to the charging groove.

The further improved solution of the present invention is: the structural size of the placing groove A matches the size of the most commonly used electronic product.

The further improved solution of the present invention is: the charging head A in the placing groove A matches a charging socket of an electronic product corresponding to the placing groove A.

The further improved solution of the present invention is: the center of gravity of the bearing rod is the geometric center of the bearing rod.

The further improved solution of the present invention is: the connecting piece A is located below the front end surface of the charging rack; two sides of the front end surface of the charging rack are symmetrically provided with clamping blocks; and the clamping blocks are movably connected to the front end surface of the charging rack along a horizontal direction.

The further improved solution of the present invention is: the connecting piece A is fixed onto the top of a horizontal rotating shaft; two ends of the horizontal rotating shaft are rotatably connected to the front end surface of the charging rack by means of supporting rods; and the axis of the horizontal rotating shaft is parallel to the front end surface of the charging rack.

The further improved solution of the present invention is: the connecting piece A is electrically connected to the output end of the power adapter provided in the base by means of a power transmission line A provided on the bottom of the horizontal rotating shaft.

The further improved solution of the present invention is: the front end surface of the charging rack inclines backwards from bottom to top.

The further improved solution of the present invention is: there are multiple charging racks, and the distribution direction of the charging racks is parallel to the distribution direction of the charging grooves.

The further improved solution of the present invention is: the front end surface of the charging stand is a placing surface inclining backwards from bottom to top, and the placing surface is provided with a placing groove B; the side of the placing groove B facing the connecting piece B is an open structure; the bottom of the placing groove B is communicated with a heat dissipation means provided on the rear end surface of the charging stand; and the heat dissipation means is electrically connected to the output end of the power adapter provided in the base.

The further improved solution of the present invention is: the heat dissipation means is a heat dissipation fan.

The further improved solution of the present invention is: the wall of the placing groove B is a stepped structure, such that multiple placing layers are formed.

The further improved solution of the present invention is: the placing layer is parallel to the placing surface with respect to the end surface of the placing surface.

The further improved solution of the present invention is: the size of each placing layer matches the electronic product of a corresponding size.

The further improved solution of the present invention is: the bottom of the connecting piece B is electrically connected to the output end of the power adapter provided in the base by means of a power transmission line B; and the power transmission line B is wound on a winding means provided in the base.

The further improved solution of the present invention is: the winding means is connected to the base by means of a coil spring, and the winding means automatically winds the power transmission line B onto the winding means by means of the coil spring.

The further improved solution of the present invention is: there are multiple connecting pieces B, and the number of the connecting pieces B is equal to the number of the placing layers.

The further improved solution of the present invention is: the top end of the charging stand is provided with a discharging groove.

The further improved solution of the present invention is: the plug-in type charging head matching the connecting piece A and the connecting piece B is placed in the discharging groove.

The present invention includes the following beneficial effects:

First, the apparatus for centralized charging of electronic products of the present invention provides a platform for centralized charging of electronic products, which not only can perform direct plug-in type charging on common electronic products to improve charging convenience, but also can charge electronic products of other models and sizes to improve product applicability.

Second, according to the apparatus for centralized charging of electronic products of the present invention, direct plug-in type charging of the charging groove can enable automatic electrical disconnection of the charging head when the charging groove is not used, thereby protecting the charging head and prolonging the service life of the charging head.

Third, according to the apparatus for centralized charging of electronic products of the present invention, when the charging rack and the charging stand do not perform electronic product charging, the plug-in type charging head is separated from the connecting piece A or the connecting piece B so as to protect the plug-in type charging head, thereby prolonging the service life of the plug-in type charging head.

Fourth, according to the apparatus for centralized charging of electronic products of the present invention, under the action of the winding means, twisting together with the power transmission line of the connecting piece B is avoided, so that the use of the connecting piece B is not affected and the apparatus for centralized charging is ensured to be tidy.

Fifth, according to the apparatus for centralized charging of electronic products of the present invention, the identifier area corresponding to the charging groove can facilitate a user quickly identifying the model of an electronic product corresponding to the charging groove.

Sixth, according to the apparatus for centralized charging of electronic products of the present invention, the front end surface of the charging rack inclines backwards from bottom to top, which facilitates fixed placement of the electronic product and improves the stability of the electronic product when placed on the charging rack for charging.

Seventh, according to the apparatus for centralized charging of electronic products of the present invention, the clamping block further improves the stability of the electronic product when placed on the charging rack for charging, and improves the applicability of the charging rack.

Eighth, according to the apparatus for centralized charging of electronic products of the present invention, the wall of the placing groove B is the stepped structure, such that multiple placing layers are formed, and thus multiple electronic products of different models can be placed in the placing groove B, where these electronic products are charged at the same time, thereby improving the applicability and practicality of the charging stand.

Ninth, according to the apparatus for centralized charging of electronic products of the present invention, under the action of the heat dissipation means, heat dissipation can be performed on multiple electronic products on the charging stand to avoid the electronic products and the charging stand from being damaged by heat.

Tenth, according to the apparatus for centralized charging of electronic products of the present invention, the placing surface of the charging stand inclines backwards from bottom to top, which facilitates stable placement of the electronic products.

Eleventh, according to the apparatus for centralized charging of electronic products of the present invention, the side of the placing groove B facing the connecting piece B is the open structure, which not only facilitates the placement of the electronic product on the charging stand or the take-out thereof from the charging stand, but also facilitates the charging of the electronic product by the plug-in type charging head fixed by the connecting piece B.

Twelfth, according to the apparatus for centralized charging of electronic products of the present invention, the discharging groove on the charging stand can be used for placing plug-in type charging heads of various electronic product models, which facilitates the take-out and use by the user and also avoids the loss of the plug-in type charging heads.

DETAILED DESCRIPTION

Figure 1:
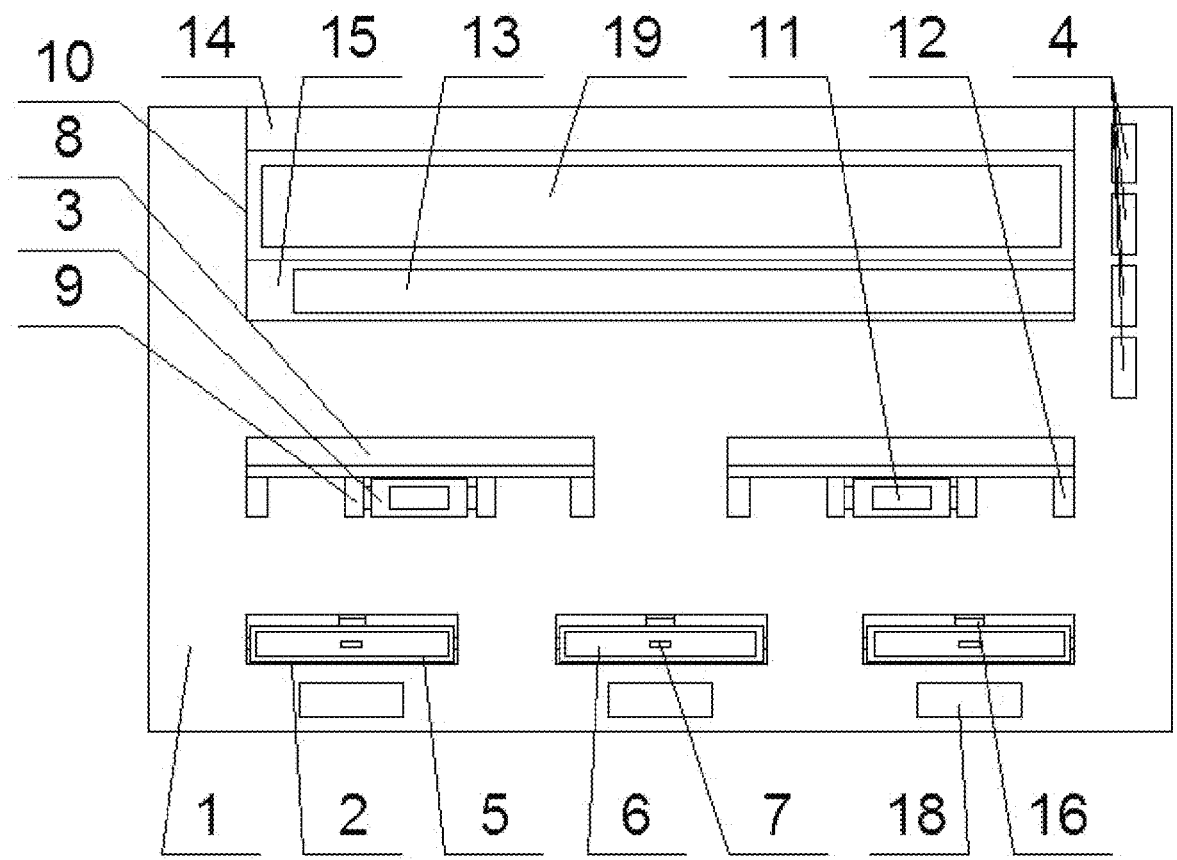
FIG. 1 is a schematic top view of a structure of the present invention.
Figure 2:
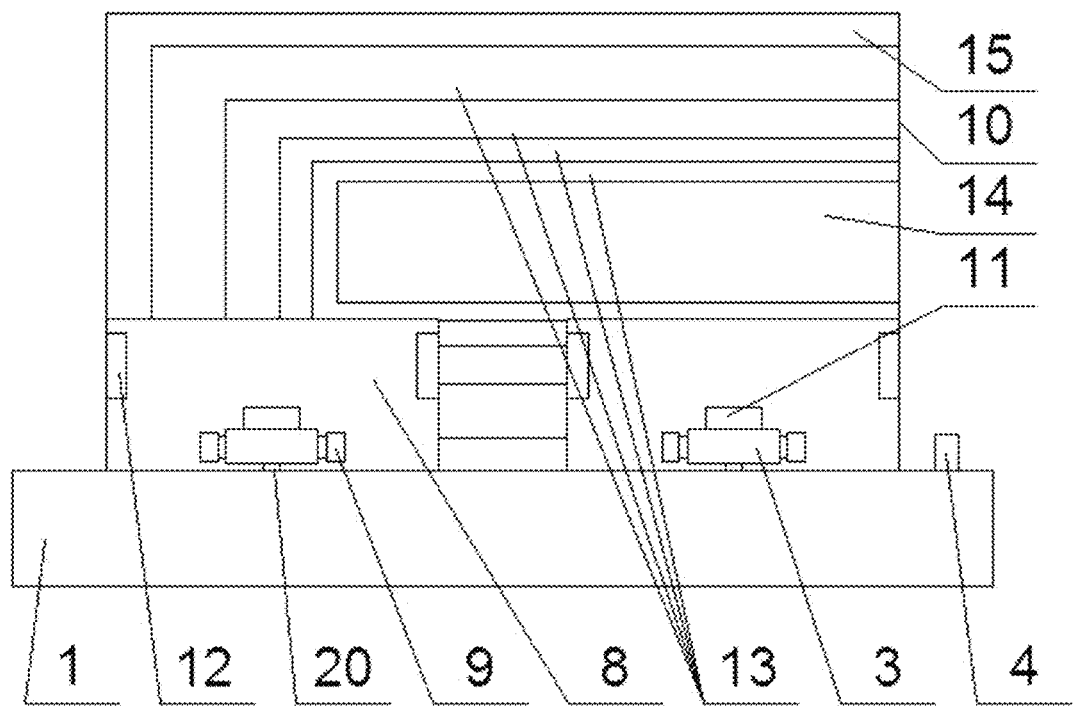
FIG. 2 is a schematic front view of a structure of the present invention.
Figure 3:
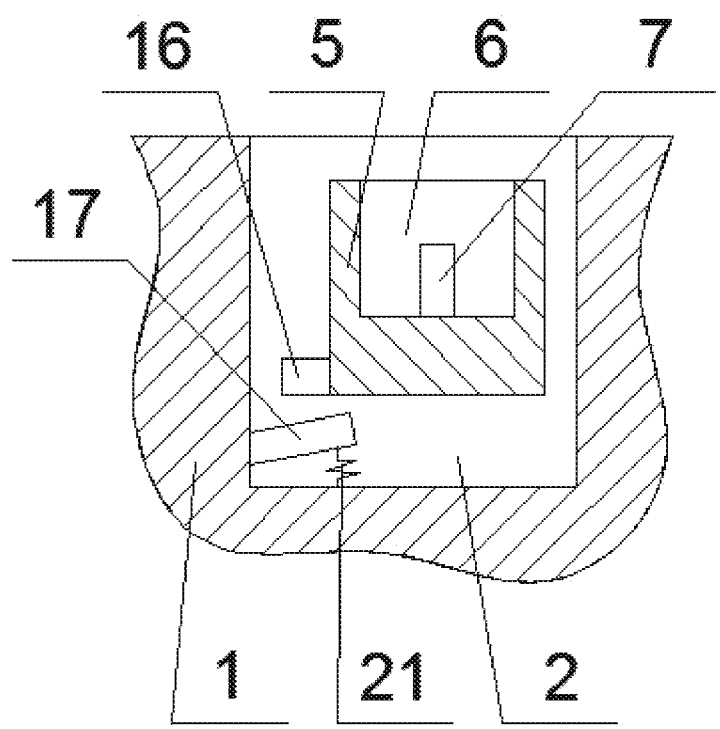
FIG. 3 is an enlarged schematic sectional side view of a charging groove structure.
Figure 4:
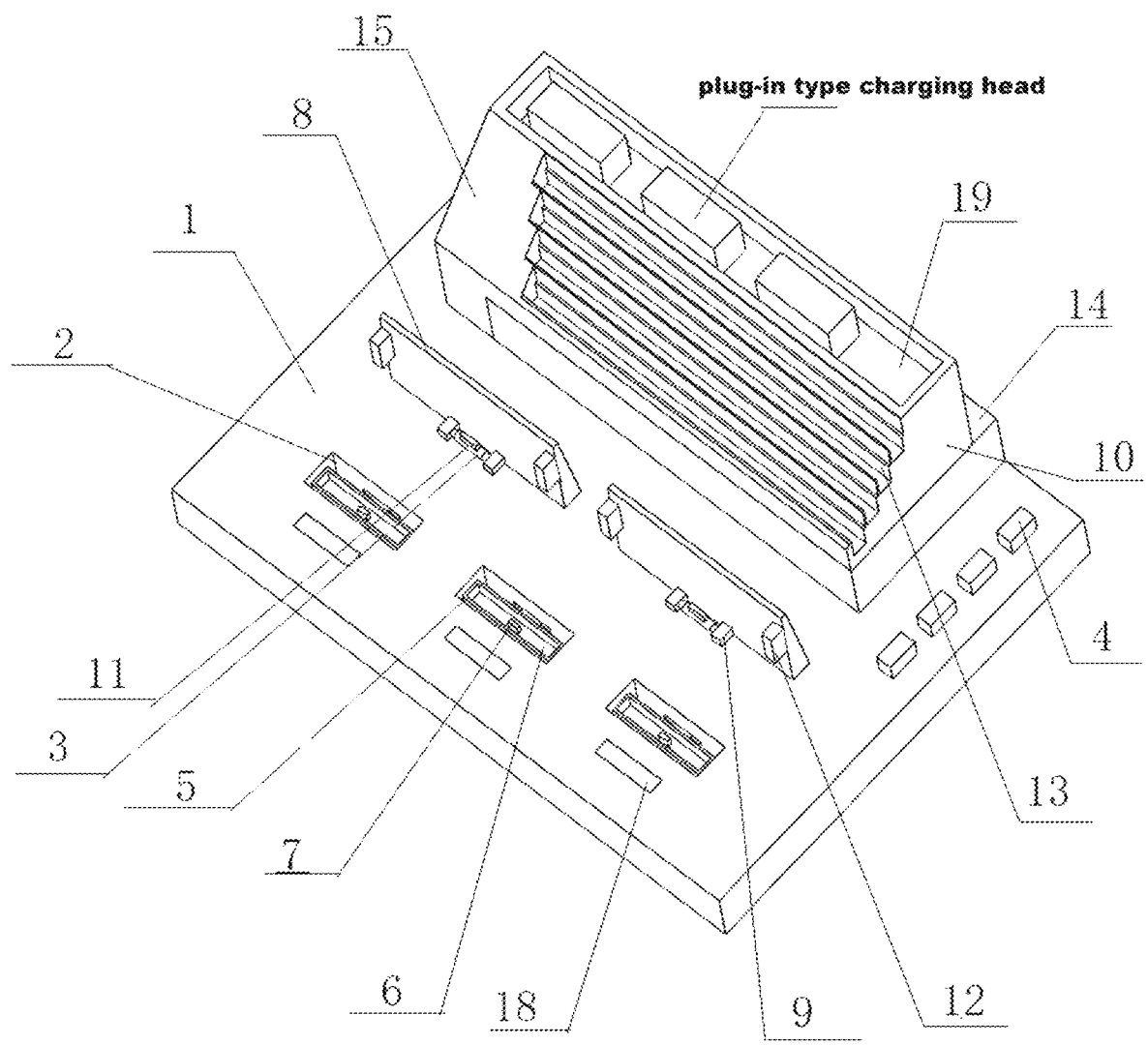
FIG. 4 is a top elevational view of a structure of the present invention.
Figure 5:
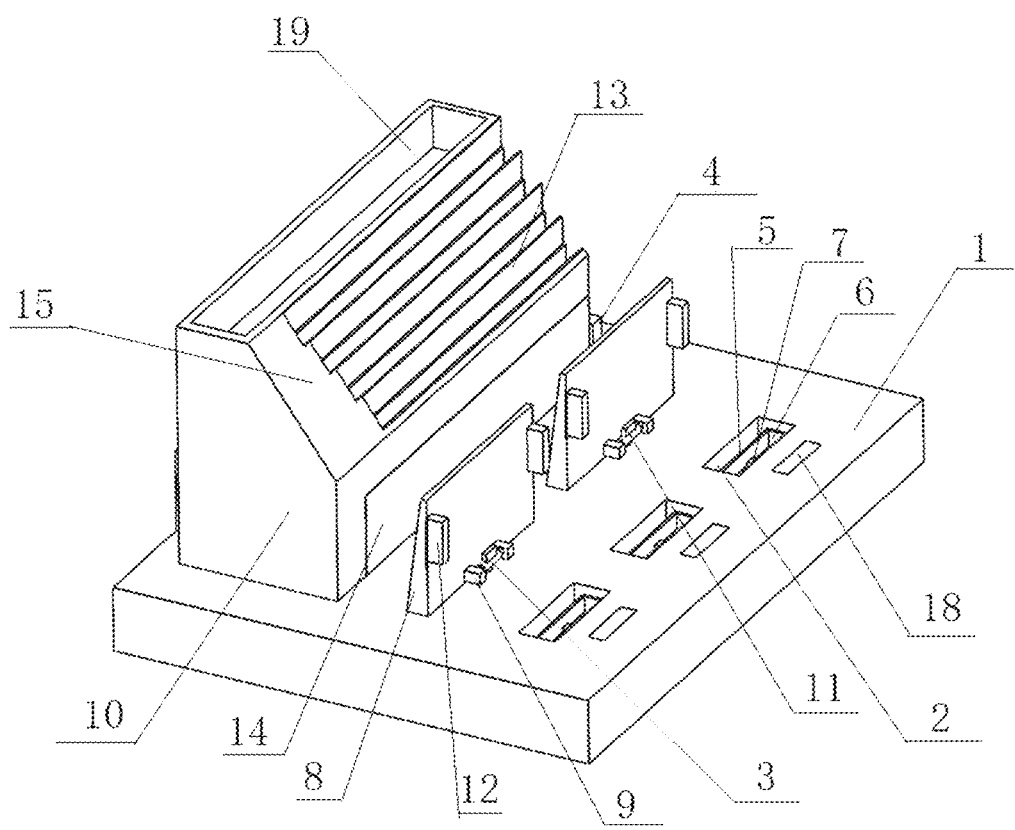
FIG. 5 is a side elevational view of a structure of the present invention.
Figure 6:
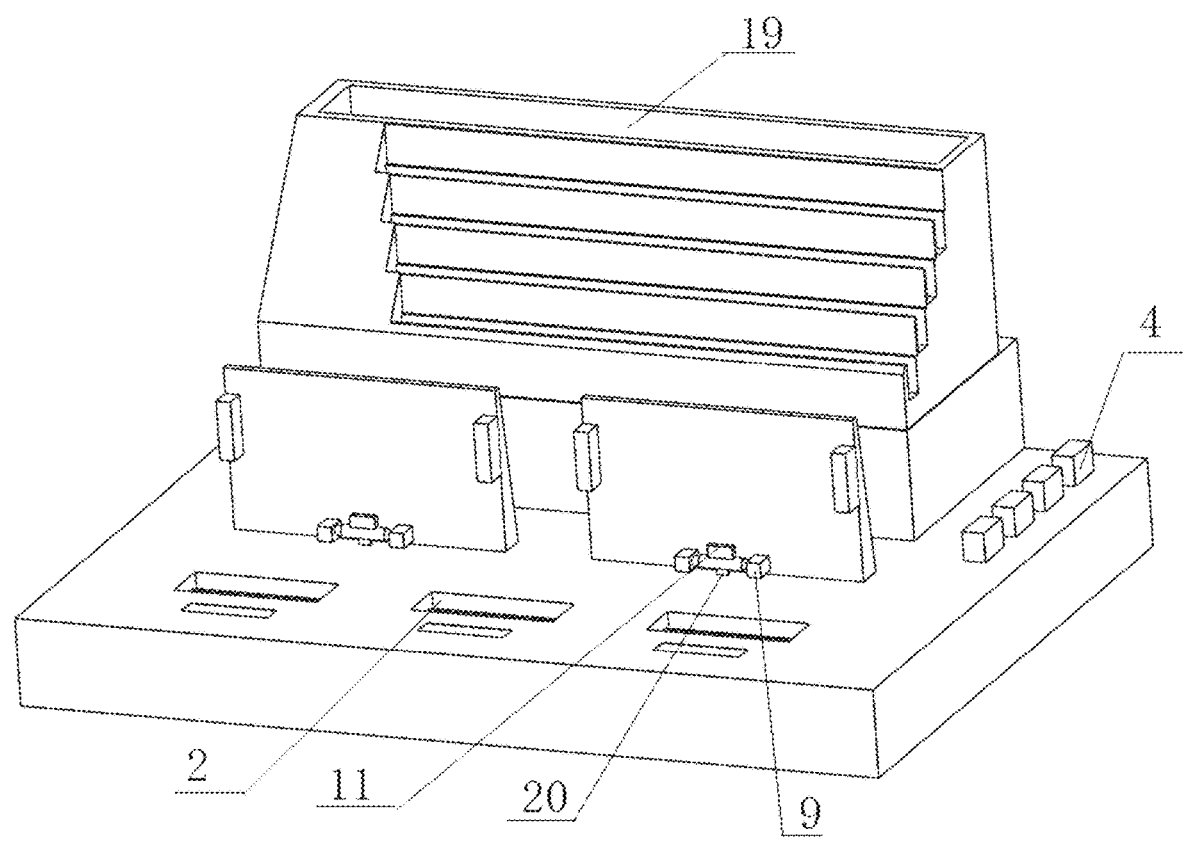
FIG. 6 is a front elevational view of a structure of the present invention.

It can be known from FIGS. 1-3 that the present invention includes a base 1, where charging grooves 2, charging racks 8, and a charging stand 10 are provided on the top surface of the base 1 in sequence from front to back; a charging head A7 is provided in the charging groove 2; a connecting piece A11 matching a plug-in type charging head is provided at the lower part of the charging rack 8; the base 1 is further provided with connecting pieces B4 matching the plug-in type charging heads; the connecting pieces B4 are located at one side of the charging stand 10; and the charging head A7, the connecting piece A11, and the connecting piece B4 are electrically connected to an output end of a power adapter provided in the base 1, respectively. The charging head A7 is fixed onto the top of a bearing rod 5; two ends of the bearing rod 5 are rotatably connected to two ends of the charging groove 2; an electrical rod A16 electrically connected to the charging head A7 is provided at the lower part of the back side of the bearing rod 5; an electrical rod B17 is provided, correspondingly below the electrical rod A16, on the inner wall of the charging groove 2; and the electrical rod B17 is electrically connected to the output end of the power adapter provided in the base 1. The electrical rod B17 is pivotably connected to the charging groove 2; and the bottom of the electrical rod B17 is connected to the bottom of the charging groove 2 by means of a spring 21. The charging head A7 is provided on the bottom of a placing groove A6 provided on the top of the bearing rod 5. There are multiple charging grooves 2, which are provided at the front side of the top surface of the base 1 in sequence. The base 1 is provided with an identifier area 18 respectively corresponding to the charging groove 2. The structural size of the placing groove A6 matches the size of the most commonly used electronic product. Moreover, the charging head A7 in the placing groove A6 matches a charging socket of an electronic product corresponding to the placing groove A6. The center of gravity of the bearing rod 5 is the geometric center of the bearing rod 5. When the bearing rod 5 is in a free state, the electrical rod A16 is separated from the electrical rod B18. The connecting piece A11 is located below the front end surface of the charging rack 8; two sides of the front end surface of the charging rack 8 are symmetrically provided with clamping blocks 12; and the clamping blocks 12 are movably connected to the front end surface of the charging rack 8 along a horizontal direction. The connecting piece A11 is fixed onto the top of a horizontal rotating shaft 3; two ends of the horizontal rotating shaft 3 are rotatably connected to the front end surface of the charging rack 8 by means of supporting rods 9; and the axis of the horizontal rotating shaft 3 is parallel to the front end surface of the charging rack 8. The connecting piece A11 is electrically connected to the output end of the power adapter provided in the base 1 by means of a power transmission line A20 provided on the bottom of the horizontal rotating shaft 3. The front end surface of the charging rack 8 inclines backwards from bottom to top. There are multiple charging racks 8, and the distribution direction of the charging racks 8 is parallel to the distribution direction of the charging grooves 2. The front end surface of the charging stand 10 is a placing surface 15 inclining backwards from bottom to top, and the placing surface 15 is provided with a placing groove B13; the side of the placing groove B13 facing the connecting piece B4 is an open structure; the bottom of the placing groove B13 is communicated with a heat dissipation means 14 provided on the rear end surface of the charging stand 10; and the heat dissipation means 14 is electrically connected to the output end of the power adapter provided in the base 1. The heat dissipation means 14 is a heat dissipation fan. The wall of the placing groove B13 is a stepped structure, such that multiple placing layers are formed. The placing layer is parallel to the placing surface with respect to the end surface of the placing surface 15. The size of each placing layer matches the electronic product of a corresponding size. The bottom of the connecting piece B4 is electrically connected to the output end of the power adapter provided in the base 1 by means of a power transmission line B; and the power transmission line B is wound on a winding means provided in the base 1 (the power transmission line B and the winding means are not shown in the drawings of the description). The winding means is connected to the base 1 by means of a coil spring, and the winding means automatically winds the power transmission line B onto the winding means by means of the coil spring. There are multiple connecting pieces B4, and the number of the connecting pieces B4 is equal to the number of the placing layers. The top end of the charging stand 10 is provided with a discharging groove 19. The plug-in type charging head matching the connecting piece A11 and the connecting piece B4 is placed in the discharging groove 19.

In the case that the charging groove 2 is used in the present invention, an appropriate charging groove 2 is selected according to the model and size of an electronic product and the identifier area 18 corresponding to the charging groove 2; the charging socket of the electronic product is then inserted into the placing groove A6 in the charging groove 2 in a manner of directly facing the charging head A7; the electronic product together with the bearing rod 5 is rotated backwards to contact the electrical rod A16 and the electrical rod B7, at which time, the power adapter in the base 1 charges the electronic product in the charging groove 2; and then the electronic product continues being rotated backwards to contact the wall of the charging groove 2. When the electronic product in the charging groove 2 does not need to be charged any more, the electronic product is directly taken out from the charging groove 2, at which time, under the action of the dead weight of the bearing rod 5, the charging groove 2 returns to an initial position so that the electrical rod A16 is separated from the electrical rod B7.

In the case that the charging rack 8 is used in the present invention, the clamping blocks 12 at two sides of the charging rack 8 are first moved outwards to have a maximum stroke, an appropriate plug-in type charging head is then selected in the discharging groove 19 according to the model of an electronic product, the plug-in type charging head is fixed and electrically connected to the connecting piece A11, then the charging socket of the electronic product directly faces the plug-in type charging head, and the plug-in type charging head is inserted into the charging socket of the electronic product, at which time, the power adapter in the base 1 charges the electronic product on the charging rack 8; then the electronic product abuts against the front end surface of the charging rack 8, and the electronic product drives the horizontal rotating shaft to rotate, so that the plug-in type charging head on the connecting piece A11 keeps being inserted into the charging socket of the electronic product; and finally, the clamping blocks 12 at two sides of the charging rack 8 are moved inwards to clamping two side edges of the electronic product. When the electronic product on the charging rack 8 does not need to be charged any more, the clamping blocks 12 are moved outwards to be separated from the electronic product, and then the electronic product is separated from the plug-in type charging head on the connecting piece A11; and then the plug-in type charging head is separated from the connecting piece A11, and the plug-in charging head is placed in the discharging groove 19.

In the case that the charging stand 10 is used in the present invention, an appropriate plug-in type charging head is first selected in the discharging groove 19 according to the model of an electronic product, and the plug-in type charging head is fixed and electrically connected to the connecting piece B4; then the connecting piece B4 with the plug-in charging head fixed thereon is pulled out, and the plug-in type charging head fixed to the connecting piece B4 is inserted into the charging socket of the electronic product, at which time, the power adapter in the base 1 charges the electronic product on the charging stand 10; then the electronic product is placed in the placing groove B13 of the charging stand 10 and contacts the placing layer in the placing groove B13 matching the electronic product in size; the placing groove B13 has multiple placing layers so that multiple electronic products can be placed at the same time, and the multiple electronic products are charged at the same time; when the charging stand 10 charges a gear number of electronic products at the same time, a large amount of heat is generated, at which time, the heat dissipation means 14 performs heat dissipation on the electronic products on the charging stand 10. When the electronic product on the charging stand 10 does not need to be charged any more, the electronic product is separated from the plug-in charging head on the connecting piece B4, at which time, the connecting piece B4 is wound on the top surface of the base 1 under the action of the power transmission line B and the winding means; and then the plug-in type charging head is separated from the connecting piece B4, and the plug-in type charging head is placed in the discharging groove 19.

The invention claimed is:

1. An apparatus for centralized charging of electronic products, comprising a base, wherein charging grooves, charging racks, and a charging stand are provided on a top surface of the base in sequence from a first side of the base to a second side of the base along a horizontal axis, and the charging grooves, the charging racks and the charging stand are free of contact from each other on the top surface of the base; a plurality of charging heads is provided in the charging grooves; a plurality of connecting pieces A matching a plurality of plug-in type charging heads is provided at a bottom portion of the charging racks; the base is further provided with a plurality of connecting pieces B matching the plurality of plug-in type charging heads; the plurality of connecting pieces B are located adjacent to a first side of the charging stand, and the first side of the charging stand is perpendicular to the first side of the base; and the plurality of charging heads, the plurality of connecting pieces A, and the plurality of connecting pieces B are electrically connected to an output end of a power adapter provided in the base, respectively.

2. The apparatus for centralized charging of electronic products according to claim 1, wherein the plurality of charging heads is fixed onto a top of a bearing rod; two ends of the bearing rod are rotatably connected to two ends of each of the charging grooves; an electrical rod A electrically connected to the plurality of charging heads is provided at a bottom portion of the bearing rod; an electrical rod B is provided, correspondingly below the electrical rod A, on an inner wall of the charging grooves; and the electrical rod B is electrically connected to the output end of the power adapter provided in the base.

3. The apparatus for centralized charging of electronic products according to claim 2, wherein the electrical rod B is pivotably connected to the charging grooves; and a bottom of the electrical rod B is connected to a bottom of the charging grooves by a spring.

4. The apparatus for centralized charging of electronic products according to claim 2, wherein each of the plurality of charging heads is provided on a bottom of a placing groove A provided on the top of the bearing rod.

5. The apparatus for centralized charging of electronic products according to claim 1, wherein the plurality of connecting pieces A is located on a bottom portion of a first surface of the charging racks; two ends of the first surface of the charging racks are symmetrically provided with clamping blocks; and the clamping blocks are movably connected to the first surface of the charging racks along the horizontal axis.

6. The apparatus for centralized charging of electronic products according to claim 5, wherein the plurality of connecting pieces A is fixed onto a top of a horizontal rotating shaft; two ends of the horizontal rotating shaft are rotatably connected to the first surface of the charging racks by supporting rods; and an axis of the horizontal rotating shaft is parallel to the first surface of the charging racks.

7. The apparatus for centralized charging of electronic products according to claim 6, wherein the plurality of connecting pieces A is electrically connected to the output end of the power adapter provided in the base by a power transmission line provided on a bottom of the horizontal rotating shaft.

8. The apparatus for centralized charging of electronic products according to claim 1, wherein a front surface of the charging stand is a placing surface inclining backwards from bottom to top, and the front surface of the charging stand is perpendicular to the first side of the charging stand, and the placing surface is provided with a plurality of placing grooves B; a side of the each of the plurality of placing grooves B facing the plurality of connecting pieces B is an open structure; a bottom of each of the plurality of placing grooves B is connected to a heat dissipation means provided on a rear surface of the charging stand, and the rear surface of the charging stand is perpendicular to the first side of the charging stand; and the heat dissipation means is electrically connected to the output end of the power adapter provided in the base.

9. The apparatus for centralized charging of electronic products according to claim 8, wherein a wall of the plurality of placing grooves B is a stepped structure, such that a plurality of placing layers are formed.

10. The apparatus for centralized charging of electronic products according to claim 1, wherein a bottom of each of the plurality of connecting pieces B is electrically connected to the output end of the power adapter provided in the base by a power transmission line; and the power transmission line is wound on a winding means provided in the base.

\* \* \* \* \*